United States Patent [19]
Ehling

[11] Patent Number: 5,903,426
[45] Date of Patent: May 11, 1999

[54] OVERVOLTAGE PROTECTION APPARATUS FOR A DATA INTERFACE

[75] Inventor: Ernst Ehling, Neuhausen, Germany

[73] Assignee: Balluff, Inc., Florence, Ky.

[21] Appl. No.: 08/732,125

[22] Filed: Oct. 18, 1996

[51] Int. Cl.⁶ .............................. H02H 3/06; H02H 1/04
[52] U.S. Cl. .............................................. 361/119; 361/91
[58] Field of Search .................................. 361/42, 54, 55, 361/57, 58, 59, 62, 63, 64, 71, 91, 93, 94, 98, 101, 118, 119

[56] References Cited

U.S. PATENT DOCUMENTS

| | | | |
|---|---|---|---|
| 3,878,434 | 4/1975 | Voorhoeve | 361/55 |
| 4,849,846 | 7/1989 | Hung et al. | 361/56 |
| 4,901,183 | 2/1990 | Lee | 361/56 |
| 5,224,054 | 6/1993 | Wallis | 364/483 |
| 5,233,511 | 8/1993 | Bilas et al. | 364/146 |
| 5,233,538 | 8/1993 | Wallis | 364/483 |
| 5,247,454 | 9/1993 | Farrington et al. | 364/483 |
| 5,495,384 | 2/1996 | Wallis et al. | 361/64 |
| 5,510,612 | 4/1996 | Scofield et al. | 361/679 |

OTHER PUBLICATIONS

Linear Technology LTC 490 Data Sheet No Date.
SGS—Thomson Microelectronics TDE1707 Data Sheet Oct. 1991.
Semtech LCDA Series TVS Data Sheet No Month 1995.

*Primary Examiner*—Ronald W. Leja
*Attorney, Agent, or Firm*—Dinsmore & Shohl LLP

[57] ABSTRACT

An overvoltage protection apparatus for use with a data transmission interface, having at least one data transmission line associated therewith, for protecting the interface from power spikes, transients, and/or the continuous application of an excessive voltage. In a preferred embodiment, the apparatus includes at least one voltage limiting device associated with each data line. Each voltage limiting device being connected at one end to the associated data line, and at a second end to a current sensing and switching structure, which is in turn connected to ground. The current sensing and switching structure monitors the current through the voltage limiting device. In the event an excessive voltage is applied to a pin or data line of the interface, the voltage limiting device briefly absorbs the excess power and generates an increased current. This increased current is sensed by the current sensing and switching structure, which responds by opening a switch which disconnects the interface from ground. The current sensing and switching structure automatically reconnects the switch after a preselected time period. The switching structure continues to monitor the current from the voltage limiting device, and open and close the switch, for an indefinite period of time until the excessive voltage condition is removed.

20 Claims, 3 Drawing Sheets

OVERVOLTAGE PROTECTION APPARATUS FOR A DATA INTERFACE

TECHNICAL FIELD

The present invention relates to an overvoltage protection apparatus for a data communication interface and, more particularly, to an overvoltage protection apparatus which protects a data interface from power spikes, transients, and/or the continuous application of an excessive power supply, by limiting the flow of current to the interface when an overvoltage condition occurs.

BACKGROUND OF THE INVENTION

Data communication interfaces are commonly used to transmit digital data between computers or other types of programmable or control systems. These data communication interfaces typically include a plurality of pins, which are each associated with a data line, and function to transmit a particular signal through the data line or provide a ground connection. A number of different standards exist for standardizing the interfaces and associated data lines across applications, so that a number of different types of equipment can communicate with each other by way of the interfaces. Some of the more common interface standards are the RS-standards, such as, for example, the RS-232 and RS-485 data interface standards. In order to transmit data over the data lines, one or more transmitters and receivers, or "transceivers" are provided in the interface. These transceivers control the transmission of data through the associated data lines in accordance with the selected standard.

The transceivers used in RS-standard interface applications are typically designed to operate within specified voltage and current ranges, and these ranges are typically specified in a manufacturer's catalog or data sheet for the interface. Operation within the voltage range specified for the interface is recommended in order to minimize errors in the transmitted data, as well as protect the interface components. If a voltage which exceeds the recommended level is applied to the interface, or any of the data lines associated with the interface, data transmission may be interrupted, or, in more severe cases, components in the interface may be destroyed.

An example of an application in which an RS-standard interface may be used to transmit signals is a magnetostrictive linear displacement transducer. In a magnetostrictive linear displacement transducer, an excitation pulse transmitted through a conductive wire in a waveguide, interacts with a magnetic field from a magnet adjacent the waveguide, to produce a torsion wave within the waveguide. The torsion wave is detected and converted into an electrical signal by a mode converter, such as a coil, and the time interval between the transmission of the excitation pulse and the detection of the converted signal is used to determine the position of an object which is connected to the magnet. In the transducer, a data interface may be used for receiving and transmitting the interrogation and reply pulse from the signal electronics associated with the waveguide pulse. In the transducer application, as in other situations in which a data interface is utilized, the application of an excessive voltage for more than a brief period of time to any of the data lines associated with the interface can cause adverse effects. In particular, the application of an excessive voltage can cause a reverse current to flow through the data interface which can cause permanent damage of the interface.

A number of circuit arrangements and components have been provided in the past for eliminating the problems associated with an overvoltage condition on one or more data lines associated with an interface. These arrangements have included shunting the data lines of the interface through a zener or transzorb diode to either ground or a positive power supply, to prevent the power in the lines from exceeding the rating of the diode or power supply. This shunting of the data lines to ground through a diode can provide protection against short overvoltage signals, such as power spikes or transients associated with an electrostatic discharge. However, because the ability of either a zener or transzorb diode to absorb power in an overvoltage situation is limited, these arrangements have not been able to provide protection in the event of an overvoltage situation which occurs for more than a brief period of time, such as would result from the inadvertent connection of an excessive power supply to a data line. Therefore, if a data line is mistakenly connected, or otherwise comes into contact with a power supply which exceeds the maximum operating voltage for the interface, for more than a brief period of time, the excess voltage may produce a reverse current through the interface transceiver to ground. This reverse current may cause irreparable damage to the transceiver.

Accordingly, to overcome the above and other problems, it is desirable to have an overvoltage protection apparatus which disables the transmission of power through a data interface upon application of a voltage either to the interface, or any data line associated with the interface, that exceeds the manufacturer's recommended voltage level. Further, it is desirable to have such an overvoltage protection apparatus which continues to protect the interface for as long as the overvoltage condition exists.

SUMMARY OF THE INVENTION

Accordingly, it is a principal object of the present invention to provide an overvoltage protection apparatus for use with a data interface.

In particular, it is a principal object of the present invention to provide an overvoltage protection apparatus which limits the flow of current through a data transmission interface during an overvoltage condition, thereby protecting the components in the interface.

Another object of the present invention is to provide an overvoltage protection apparatus which continues to limit power to a data interface in the event of an overvoltage condition for as long as the overvoltage condition exists.

A further object of the present invention is to provide an overvoltage protection apparatus which can be utilized with both digital and analog transmission interfaces and, in particular, any RS-standard interface.

Yet another object of the present invention is to provide an overvoltage protection apparatus which protects a data communication interface in an overvoltage condition, regardless of the polarity of the source of the overvoltage with respect to ground.

A still further object of the present invention is to provide an overvoltage protection apparatus which can be used with a magnetostrictive linear displacement transducer without significantly decreasing the accuracy of the transducer.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects, and in accordance with the purposes of the present invention as described above, an overvoltage protection apparatus is provided for use with a data transmission interface, having at least one data line, for protecting the interface in the event of power spikes and transients, as well as the continuous application of an excessive voltage. The apparatus includes at least one voltage limiting device associated with each data line. Each voltage limiting device being connected at one end to the associated data line, and at a second end to a current sensing and switching device, which is in turn connected to ground. The current sensing and switching device monitors the current through the voltage limiting device. In the event an excessive voltage is applied to a pin or data line associated with the interface, the voltage limiting device connected to the data line briefly absorbs the energy from the excess voltage, and in turn increases the current flow from the device. The increased current from the voltage limiting device is sensed by the current sensing and switching device, which responds by opening a switch which disconnects the circuit, and correspondingly the interface, from ground. The current sensing device continues to sense the current level from the voltage limiting device, and periodically open and close the switch, for an indefinite period of time, until the excessive voltage condition is removed.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different, obvious aspects all without departing from the invention.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE PREFERRED EMBODIMENTS

Figure 1:
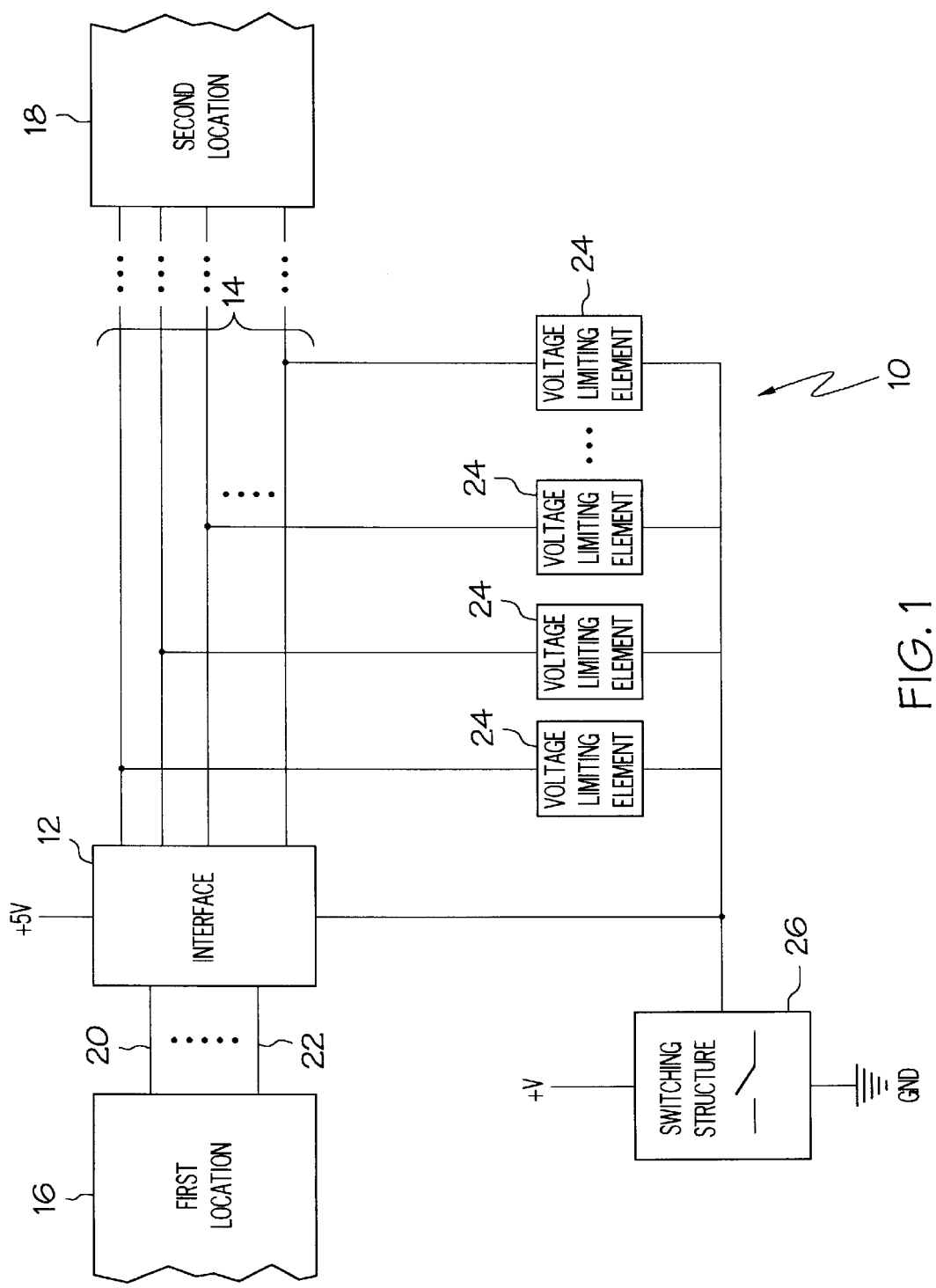
FIG. 1 is a schematic diagram of an overvoltage protection apparatus of the present invention applied to a data interface and associated data lines.

Referring now to the drawings in detail, wherein like numerals indicate the same elements throughout the views, FIG. 1 is a schematic depiction of a representative embodiment of an overvoltage protection apparatus, designated generally as 10, made in accordance with the present invention. As shown in FIG. 1, the apparatus 10 of the present invention is preferably utilized with a data communication or transmission interface 12 which includes a number of data lines 14 for transmitting data between two or more locations, designated as 16, 18. In addition to the data lines 14, the interface 12 also typically includes one or more input and output pins 20, 22. As shown in FIG. 1, these pins 20, 22 enable signals from a first location 16 to be connected to the interface 12 for transmission through the data lines 14 to a second location or interface 18. The number of data transmission lines 14 and input/output pins 20, 22 will vary depending on the particular interface being used, as well as the particular standard selected for the application. While the present invention will be described with respect to its use with an RS-485 standard interface having a differential transceiver, it is to be understood that the present invention is applicable to any type of interface in which it is desirable to protect components in the interface from the inadvertent application of an excessive power or voltage to any pin of the interface, regardless of the interface standard, number of pins or data lines being used, without departing from the scope of the invention.

As shown in FIG. 1, in the present invention a voltage limiting element 24 is preferably connected to each data line 14. Each of the voltage limiting elements 24 is in turn connected to ground through current sensing and switching structure 26. When the switch associated with the switching structure 26 is in a closed position, the data lines 14, voltage limiting elements 24 and switching structure 26 form a plurality of circuit branches between the interface 12 and ground.

Figure 2:
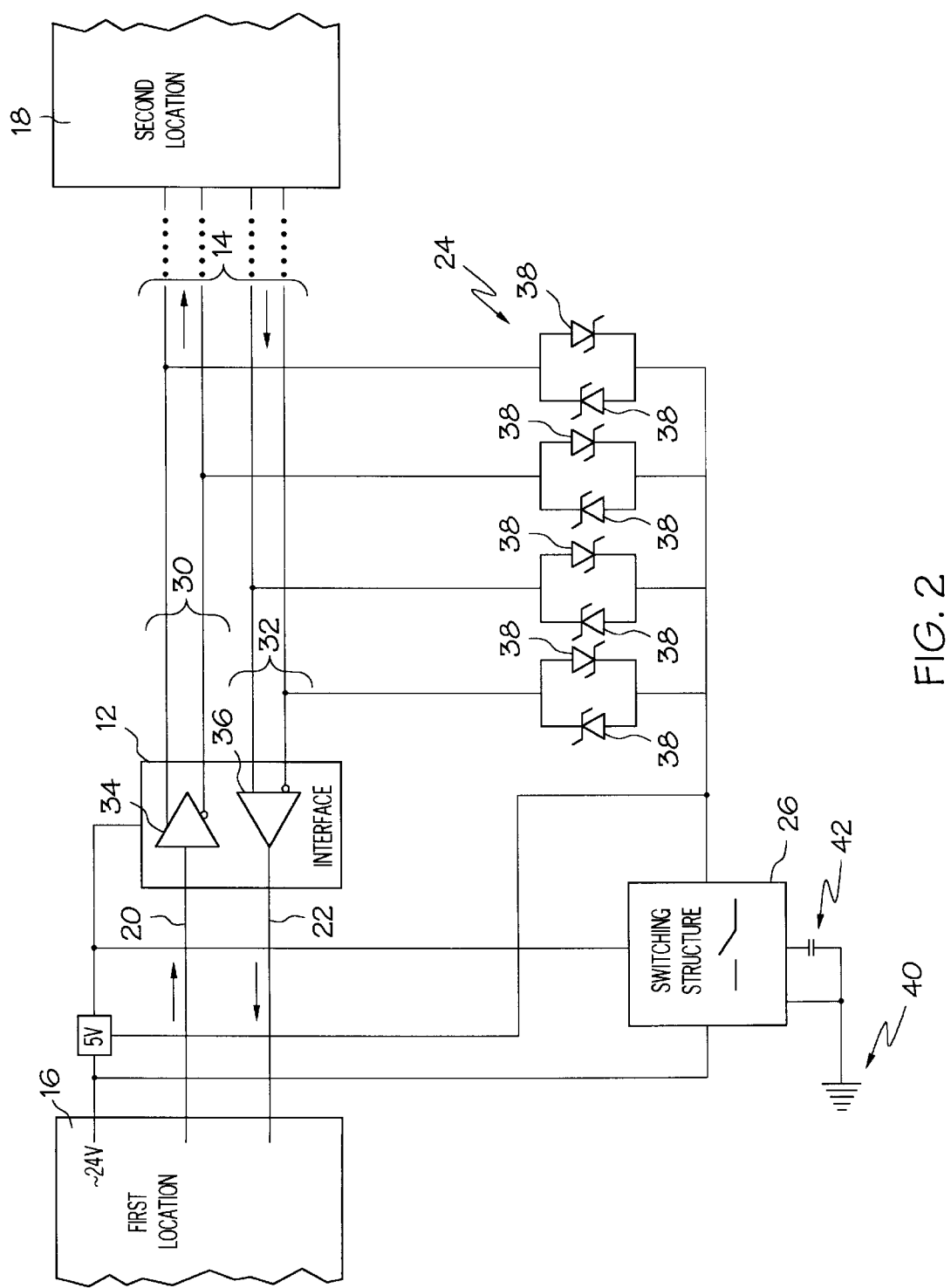
FIG. 2 is a schematic diagram depicting a representative embodiment of the apparatus of the present invention in greater detail.

FIG. 2 depicts a representative embodiment of the present invention in further detail. In FIG. 2, the apparatus of the present invention is shown as applied to an RS485 standard interface 12, having an input line 20 and an output line 22, which transmits data between a first location 16, which may be a computer, electronic control, or any other form of signal generating device, and a second location or device 18 which may also be an RS-485 interface. In addition to the input/output pins 20, 22, the interface 12 includes a four data line bus 14 consisting of a pair of output data lines 30 for transmitting a differential output signal, and a pair of input data lines 32 for receiving a differential input signal. The input and output lines 30, 32 are used for transmitting signals back and forth between the interface 12 and second location or interface 18. In the representative embodiment shown in FIG. 2, the interface 12 is an LTC490 low power differential bus/line transceiver, which is manufactured by Linear Technology. This particular interface includes a driver 34 and a receiver 36 which provide for full duplex data transmission. This interface is described in further detail in the Linear Technology data sheet for the LTC490 which is hereby incorporated by reference. While the invention is shown applied to an LTC490 interface, it is to be understood that this interface is provided only as an example, and that the present invention is applicable to any number of other types of interfaces, both analog and digital, without departing from the scope of the invention.

As mentioned above, in the present invention a voltage limiting or suppressing device 24 is attached to each data line 14 associated with the interface 12. In the representative embodiment shown in FIG. 2, the voltage limiting devices are comprised of transzorb diodes 38, which provide transient voltage suppression by absorbing high power spikes over a short period of time. In addition to absorbing the excessive voltage for a short period of time, the transzorb diodes 38 perform a sensor function in the present invention, by sensing an overvoltage in the data interface 12 and generating an increased current in response thereto. As shown in FIG. 2, each voltage limiting device may be comprised of a parallel connected pair of transzorb diodes 38, of opposite bias, to provide bidirectional protection and, thus, protect the interface 12 whether the overvoltage is positive or negative with respect to ground. Alternatively, for the RS485 standard application described in the representative embodiment, the transzorb diodes 38 may be provided in the form of a surface mounted low capacitance TVS array, such as that manufactured by Semtech in their LCDA series. This TVS array is described in further detail in the manufacturer's data sheet for the component which is hereby incorporated by reference. As a further alternative, a single, bidirectional transzorb diode may be connected to each data line.

As shown in FIG. 2, the transzorb diodes 38 extend from the data lines 14 to ground 40 through the current sensing and switching structure 26. In the present invention, the switching structure 26 monitors the current from the transzorb diodes 38 and provides a switching function for breaking the connection between the data lines 14 and ground if the sensed current should exceed a predetermined level. In the representative embodiment depicted in FIG. 2, the sensing and switching structure 26 is a TDE1707 intelligent power switch, which is manufactured by SGS-Thomson Microelectronics. The TDE1707 is an integrated or intelligent power switch that provides both a current sensing and an automatic switching function. The TDE1707 is described in further detail in SGS-Thomson's data sheet for the component which is hereby incorporated by reference. In the present invention, the current sensor in the power switch 26 monitors the current flowing from the transzorb diodes 38 to ground with respect to a turn-off current value for the switch. In the representative embodiment, the turn-off current value for the TDE1707 is 500 mA. This turn-off current value enables the apparatus to switch-off the current through the interface when a voltage which exceeds the 5.25 V level is applied to a data line. However, this 500 mA value is only representative of a current turn-off level, and the switching structure 26 may be activated at other current levels, depending on the application and recommended voltage level for the application, without departing from the scope of the invention. If the current from the transzorb diodes 38 reaches the turn-off value for the switching structure 26, the power switch is activated to break the connection between the transzorb diodes and ground, thereby interrupting the current flow.

In addition to the current sensing and switching functions, the power or intelligent switch 26 also preferably includes a periodic integrated turn-on function. This turn-on function is activated when the switch is opened. Once activated, the turn-on function operates to automatically close the switch in the structure 26 after a preselected delay time period. This delay time period, during which the switch is opened and the ground connection is interrupted, may be determined by using a capacitor 42 in conjunction with the switch 26. In the representative embodiment in which a TDE1707 is used as the switching structure 26, the delay time capacitor 42 is connected to pin 3 of the TDE1707 power switch. Accordingly, the delay time can be varied as desired by varying the capacitance 42 connected to the switch. In the representative embodiment, the delay time capacitor 42 has a value of approximately 30 nF. This capacitance provides a delay time between switch turn-off and turn-on of approximately 30 milliseconds.

The delay time of the power switch 26 and the maximum overvoltage from which it is desired to protect the interface 12 determines the amount of energy which must be absorbed by the transzorb diodes 38. Accordingly, the transzorb diodes for a particular application are selected based upon the level of overvoltage it is desired to protect against, and the energy absorbing capability of the transzorb diodes. In the representative embodiment described above, in which a 300 watt surface mount low capacitance TVS array is utilized for the transzorb diodes, the apparatus can provide protection against the application of an overvoltage of up to 48 volts.

In the representative embodiment of the present invention, in which a TDE1707 intelligent switch is used as the switching structure 26, each of the transzorb diodes 38 is connected to the low side output of the switch. The low side of the TDE1707 switch is preferably utilized in this embodiment of the invention to accommodate the low power associated with the data lines of an RS485 interface. While the invention has been described with respect to a representative embodiment in which a TDE1707 intelligent power switch is used as the current sensing and switching structure 26, this component is only representative of the type of components which may be utilized to achieve the purposes of the invention. It is to be understood that one or more other components, such as current sensors, automatic switches or fuses, or current limiters may also be utilized without departing from the scope of the invention.

Figure 3:
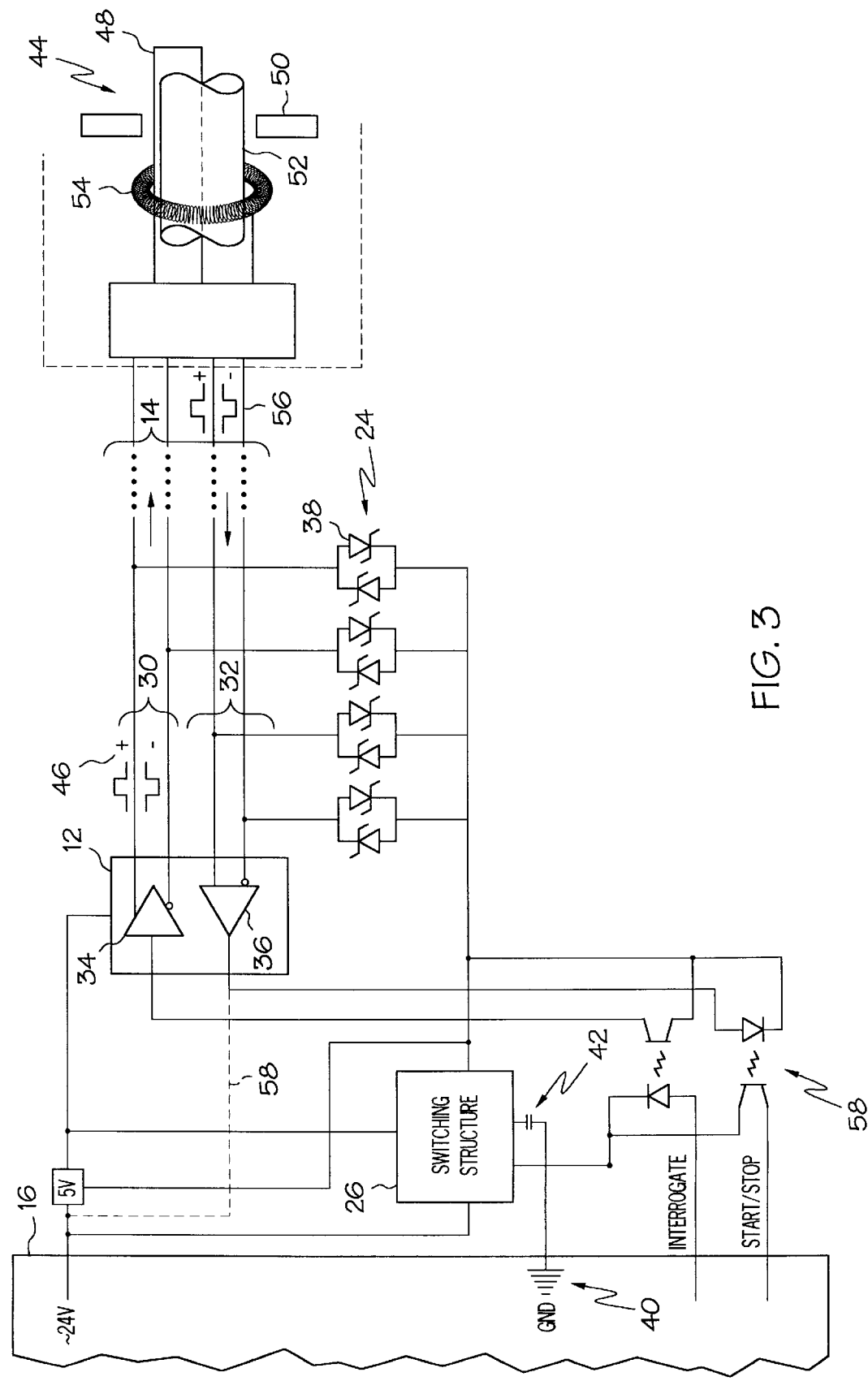
FIG. 3 is a schematic diagram depicting a representative embodiment of the apparatus of the present invention applied to a magnetostrictive linear displacement transducer.

The operation of the apparatus of the present invention will now be described with respect to a representative application, wherein the apparatus is applied to a data transmission interface for a magnetostrictive linear displacement transducer. This representative application is depicted in FIG. 3, in which the magnetostrictive linear displacement transducer is designated generally as 44. In this representative application, the data interface 12 is used for transmitting an interrogation pulse 46 from a first location 16, which in this application may be an electronic controller for the transducer 44, to the conductive wire 48 of the transducer. Once the pulse 46 reaches the transducer 44, it is transmitted through the wire 48 where it generates a field which interacts with the field from a magnet 50 positioned along a waveguide 52. The interaction of the two fields produces a torsion wave which travels along the waveguide 52. When the torsion wave reaches the end of the waveguide, it is detected by a coil 54 which generates an electrical signal. This electrical signal is transmitted as a start/stop pulse 56 back through the data interface 12 to the controller 16. The time period between the start/stop pulses 46, 56 is used by the controller 16, or associated equipment, to determine the position of the magnet 50 along the waveguide 52.

In the transducer application, a 20–24 volt power supply is typically utilized to power the controller 16, and to generate a 5 volt power supply for the interface 12. Oftentimes problems occur during installation of the transducer 44, in that the line from the 24 volt power supply is inadvertently connected to a pin of the interface 12, as shown by the dotted line 58 in FIG. 3, or in some other way comes into contact with the interface 12. Since the maximum specified voltage level for the interface 12 used in the representative embodiment is 5.25 volts, the application of a 24 volt supply to this interface produces an overvoltage condition. The application of the 24 volt supply, or any other voltage over the approximate 5 volt maximum level, typically causes a reverse current to flow through the driver 34 and receiver 36 components to ground 40.

According to the present invention, when an excessive voltage is applied to the interface 12, the energy generated from this voltage is briefly absorbed by the transzorb diodes 38 connected to the affected data line. This build up of energy in the transzorb diodes 38 temporarily suppresses the overvoltage. As the energy continues to build up in the transzorb diodes 38, an additional current is produced. This current flows from the transzorb diodes 38 to the current sensing and switching structure 26. The structure 26 monitors the current, and when it exceeds the turn-off value of the element, a switch is activated to open the ground connection. The opening of the ground connection prevents further current from flowing through the interface 12. The activating of the switch also preferably initiates the turn-on function of the intelligent switch, beginning the delay period. Preferably, the delay time for the switch is selected such that the average power transmitted to the transzorb diodes between the closing and opening of the switch is less than the rated power for the diodes.

At the end of the delay time period for the switch, the switch is automatically closed again. If the overvoltage condition has been removed, as may be the case if the overvoltage was due to a transient voltage or power spike, the current flow from the transzorb diodes 38 will have decreased to below the turn-off value of the element 26 and thus the switch will remain closed. However, if the overvoltage condition continues, the closing of the switch in device 26 will again cause an energy build-up in the transzorb diodes 38, and an increase in the current flow from the diodes to ground 40. Once the current again increases beyond the turn-off level of the intelligent switch, the switch will again be activated to open the ground connection, and the delay time period will begin again.

Accordingly, in the apparatus of the present invention, the opening of the switch, activation of the integrated structure function, and automatic switch closing can be repeated as often as necessary until the overvoltage condition is removed. The interaction of the transzorb diodes and the intelligent switch protect the data interface by disconnecting the ground connection for the duration of the overvoltage condition, thus providing protection not only from transient voltages, but also from more extended applications of an excessive voltage.

As shown in FIG. 3, an optocoupler, designated generally as 58, may be provided between the controller 16 and the interface 12 for transmitting the start/stop pulses. This optocoupler 58 protects the interface 12 in the event that the interface is shut-down from an overvoltage condition, in view of the different voltage and ground levels between the controller 16 and the interface 12.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment shown and described was chosen in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An apparatus for protecting a data interface having at least one data line connected thereto, in the event of an overvoltage condition, the apparatus comprising:

current sensing and switching structure located between each data line and ground for disconnecting a circuit formed by a source of the overvoltage, the interface and ground during the overvoltage condition; and at least one voltage limiting element associated with each data line connecting the associated data line to the current sensing and switching structure, and suppressing power from the overvoltage source until the circuit is disconnected.

2. The apparatus as recited in claim 1, wherein the current sensing and switching structure comprises an intelligent switch.

3. The apparatus as recited in claim 1, wherein the current sensing and switching structure includes a current monitoring component for monitoring current flow from each voltage limiting element.

4. The apparatus as recited in claim 3, wherein the current sensing and switching structure includes a switch which is activated when the current monitoring component detects a change in the current flow from the voltage limiting elements.

5. The apparatus as recited in claim 4, wherein the switch is activated when the current flow from the voltage limiting elements exceeds a predetermined level.

6. The apparatus as recited in claim 5, wherein the current sensing and switching structure includes an integrated turn-on function, and includes at least one component for determining a delay time associated with the structure function.

7. The apparatus as recited in claim 1, wherein each voltage limiting element comprises at least one transzorb diode.

8. The apparatus as recited in claim 7, wherein each voltage limiting element comprises a pair of transzorb diodes connected in parallel with opposite biases.

9. The apparatus as recited in claim 1, wherein the interface transmits signals to and from a magnetostrictive linear displacement transducer.

10. An apparatus for protecting a data interface having one or more data lines connected thereto, from an excessive voltage applied to any one of the data lines, the apparatus comprising:

at least one voltage limiting device associated with each data line, each device being connected to the associated data line; and an intelligent switch connected between each voltage limiting device and ground, the intelligent switch being activated to disrupt current flow through the interface when current flow from at least one voltage limiting device exceeds a predetermined level.

11. The apparatus as recited in claim 10, wherein the intelligent switch includes a current sensing component for sensing current from the voltage limiting device.

12. The apparatus as recited in claim 11, wherein each voltage limiting device comprises at least one transzorb diode.

13. The apparatus as recited in claim 12, wherein the interface comprises an RS-standard interface.

14. The apparatus as recited in claim 13, wherein the intelligent switch further comprises structure for closing the switch at a preselected time period after the switch is opened.

15. The apparatus as recited in claim 14, further comprising a capacitor associated with the intelligent switch for determining the time period.

16. The apparatus as recited in claim 15, wherein the interface transmits signals to and from a magnetostrictive linear displacement transducer.

17. A method for protecting a data interface having at least one data line connected thereto, from an excessive power source which might be applied to any connected data line, the method comprising the steps of:

using a transzorb diode to briefly absorb power from the power source;

monitoring current flow from the transzorb diode;

activating a switch upon detecting a change in the current flow from the transzorb diode; and closing the switch at a preselected time period after the switch is activated.

18. The method as recited in claim 17, wherein the switch will be repeatedly activated upon successive expirations of the preselected time period until the excessive power source is removed.

19. The method as recited in claim 17, further comprising the steps of comparing the current flow from the transzorb diode with a predetermined level and activating the switch when the current flow exceeds the predetermined level.

20. A method for protecting a data interface having at least one data line connected thereto, from an excessive power source which might be applied to any connected data line, the method comprising the steps of:

using a transzorb diode to briefly absorb power from the power source;

monitoring current flow from the transzorb diode;

opening a switch upon detecting a change in the current flow from the transzorb diode; and closing the switch after the switch has been open for a period of time, wherein the opening and closing steps are repeated until the excessive power source is removed.

* * * * *